This invention relates to a new and improved fishing net construction, and more particularly relates to a fish landing net of the foldable type and also being characterized by its extensibility and rigid construction.

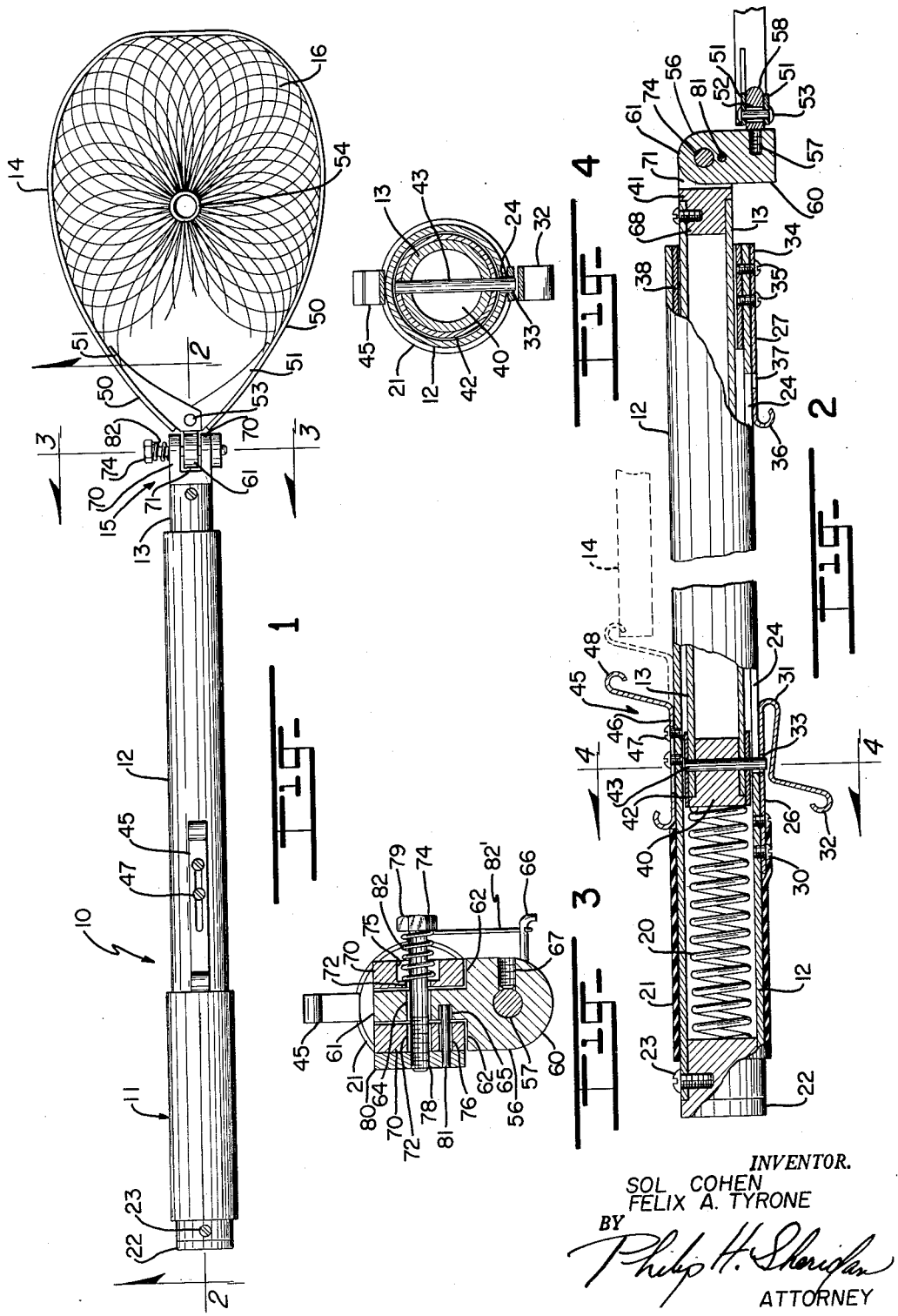
May 8, 1962 S. COHEN ETAL 3,032,908
FISH LANDING NET
Filed June 22, 1960
INVENTOR.
SOL COHEN
FELIX A. TYRONE
BY
Philip H. Sheridan
ATTORNEY 3,032,908
FISH LANDING NET
Sol Cohen, 1525 Monroe St., and Felix A. Tyrone,
1275 S. Pearl St., both of Denver, Colo.
Filed June 22, 1960, Ser. No. 37,977
7 Claims. (Cl. 43—12)

In this art, it is customary to employ or devise in the construction of fishing nets various forms of spring action or bias means to enable automatic extension of the net when it is desired to put it to use. Of course, this has the advantage of enabling the fisherman or angler to carry the net in retracted position, then when desired to release it for movement to an extended position in retrieving the fish so that until the fisherman gets the strike the net will be safely out of the way, will not hang in the water and also may be made to be of much greater length in the extended position at the time the fish is to be drawn in. However, the present invention is directed to a novel and improved way of constructing the handle and frame of the net in connected relation such that the device is rigidly positioned at either end limit of movement in the retracted and extended positions and is also biased in such a way that the entire assembly may be simultaneously and selectively released whereupon the handle portion will immediately spring outwardly and the net frame will spring to an extended position for use. Moreover in this construction and arrangement the above is accomplished merely by manipulation with one hand and in a positive way so that the entire mechanism is self-releasing for extension to a rigid position so as to prevent accidental collapse. Also, an incidental feature of the present invention is to provide in conjunction with the above a weighted net construction so that the net, regardless of the way in which the handle and frame are directed will always extend downwardly so as to be in proper position for snaring the fish.

Accordingly, it is a principal object of the present invention to produce a fish landing net construction which, in overcoming a number of the drawbacks and disadvantages of the prior art, is reliable and dependable in operation, and moreover, may be economically manufactured and assembled.

It is another object of the present invention to provide for a fish net construction of the foldable, extensible type wherein both the handle and frame are connected together in such a way as to co-act to enable quick positive release from a rigid retracted position to a rigid extended position when it is desired to use the net.

It is a further object of the present invention to provide in a fish landing net device a novel hinged connection between the handle and frame thereof which co-acts with the handle portion to be automatically extensible upon release of the handle for extension into a rigid outwardly extending direction from the handle portion; furthermore, wherein the hinged connection permits positive quick release from the extended position for folding of the frame to a retracted position along with the handle portion when the fish net is not in use.

It is a further object to provide in a fish net construction a novel and improved means for positive quick release of the handle and frame from retracted and folded positions respectively under the influence of spring members co-acting together to urge the handle and frame to outer extended positions, all of which may be accomplished by manipulation with one hand and by a single releasing action, and where in conjunction therewith a weighted mesh construction is provided to insure that the net proper will be always in the proper position in use.

The above and other objects and advantages of the present invention will become more apparent from the following detailed description taken together with the accompanying drawings, in which:

FIGURE 1 is a top view illustrating a preferred embodiment of the fish landing net of the present invention;

FIGURE 2 is a side view taken on line 2—2 of FIGURE 1, and partially in section, of the landing net, in accordance with the present invention;

FIGURE 3 is a sectional view taken on line 3—3 of FIGURE 1; and

FIGURE 4 is a sectional view taken on line 4—4 of FIGURE 2.

Referring more particularly to the drawings, there is shown by way of illustrative example a preferred embodiment of a fish landing net construction 10 which is broadly comprised of a handle 11 defined by a pair of outer and inner telescoping members 12 and 13 respectively, a frame 14 and a hinged connection 15 serving to interconnect the frame to the distal end of the inner telescoping member 13, and the frame has positioned thereon in suspended relation a mesh construction 16.

As best seen from FIGURE 2, the handle section 11 is formed for selective slideable movement of the inner telescoping member 13 in relation to the outer telescoping member 12 between a retracted position and an outer extended position. This is accomplished essentially by means of a compression spring 20 which in a well known manner will selectively urge the inner telescoping member 13 forwardly through the outer member 12. As shown, the outer telescoping member 12 is of a generally tubular metallic construction having a sleeve 21 at its rearward end forming a gripping surface for handling the entire device and this gripping surface may be suitably composed of a material such as cork, plastic or rubber so as to permit firm gripping and control of the net by the fisherman at all times. The tubular member itself may be closed at its rearward end by means of a suitable plug 22 connected in place by a set screw 23. Extending longitudinally throughout the intermediate and forward length of the outer member is a slot 24 which in a manner to be described forms a guide for forward extension of the inner telescoping member. In addition, on the exterior surface of the outer member adjacent each end of the slot there is provided a rearward catch or limit stop 26 and a forward catch or limit stop 27. The rearward catch is essentially defined by a flexible leaf spring having a flat portion connected by means of screws 30 to the tubular member, a forward loop portion 31 and a free end portion 32 defining a lever to permit manual flexing outwardly of the loop portion 31 from the surface of the tubular member 12. Additionally, an opening 33 is provided in the loop portion 31 at a point extending along the surface of the outer member which is positioned directly over the rearward end of the longtudinal slot 24 for a purpose to be described. In turn, the forward catch 27 similarly includes a flat surface portion 34 secured by means of screws 35 to the tubular member 12 and a free end portion 36 having an opening 37 aligned over the forward end of the longitudinal slot, and the free end portion 36 is free to flex outwardly from the surface of the tubular member 12 in essentially the same way as the loop portion 31. In passing, it will be noted that the forward end of the outer member 12 has connected to its inner surface a reinforcement sleeve 38 also held in place by the screws 35 and which is dimensioned to form an opening essentially the same diameter as that of the inner telescoping member 13 so as to prevent any wobbling action as the inner member is caused to slide through the outer member 12.

The inner telescoping member 13 is similarly of a generally tubular construction having closed ends defined by a rearward plug 40 and a forward male end fitting 41, and also disposed about the rearward end is a sleeve 42 which is of a diameter just less than that of the outer tubular member 12 so as to permit close sliding action therebetween and then at its forward end limit of movement this sleeve 42 will abut against the reinforcing sleeve 38 on the outer tubular member 12. Projecting transversely through the rearward end of the inner member 13 and through the plug 40 and sleeve 42 is a pin member 43 which extends beyond the sleeve at one end for extension through the longitudinal slot 24 of the outer tubular member 12 and into or through the opening 33 on the rearward catch 26, or the opening 37 on the forward catch 27. Between these end limits of movement however the pin is free to ride through the longitudinal slot 24 so as to properly guide the inner telescoping member and prevent any relative rotation between the inner and outer members 12 and 13. As noted, the spring 20 is held in compressed relation between the plug end 22 of the outer member and the plug end 40 of the inner member so as to constantly urge the inner telescoping member in a forward direction for extension through the outer member 12 until the pin moves into the opening 37 and the sleeve abuts against the sleeve 38. Accordingly, the lever 32 is disposed in essentially the same way as a trigger so as to permit the user by curving his finger around the lever 32 to flex the loop portion outwardly until the opening 33 and loop clear the outer extremity of the pin 43 so that the inner member 13 with be immediately forced in a direction under the action of the spring 20 toward its forward end limit of movement.

It will also be noted that there is positioned essentially in diametrically opposed relation to the rearward catch 26 another leaf spring 45 which defines a holder for the frame and includes a flat surface portion 46 connected by screws 47 to the tubular member and a forwardly and outwardly extending free end portion 48. As shown dotted in FIGURE 2 the free end 48 is formed to retain the end of the frame 14 in folded position against the surface of the handle when the entire assembly is in retracted position. Then just as soon as the pin 43 is released by flexing of the spring 26 the frame will be caused to move forwardly with the inner telescoping member 13 so as to clear the end portion 48 and be free to swing outwardly and forwardly about the hinged connection 15.

In accordance with conventional practice, the frame 14 may be formed of a flat metal strip or hoop which is relatively thin so as to give the frame some limited collapsibility. This hoop is preferably curved in the form of an oval as best seen in FIGURE 1 and includes free end portions 50 brought together at a point adjacent the hinged connection 15 and each includes a flange 51 secured to the inner surface of the free ends provided with aligned openings 52 for reception of a suitable rivet 53. In this way, the hoop retains its limited degree of collapsibility since the free end portions may be flexed inwardly and outwardly about the rivet 53 and flange end portions 51. Additionally, the mesh 16 may be of any suitable construction such as cloth or plastic, and preferably in forming the mesh a relatively heavy metal washer 54 is formed at the point of convergence of the strings forming the mesh so as to always cause the mesh to hang downwardly whereby tangling is avoided and also the net is in proper position for use at all times.

A primary feature of the present invention is the hinged connection formed between the inner telescoping member 13 and the frame 14 and this connection includes, along with the female end portion 41 (which is secured and serves to close the forward end of the inner member 13), a male end portion 56. The latter includes a solid portion 60 which is provided with a suitable bore for reception of threaded end 57 of an eyelet 58 which is interposed between the flanges 51 of the frame and has an opening aligned with the openings 52 to similarly receive the rivet 53. Additionally, it will be seen that the solid end portion 60 includes another bore extending at right angles to the threaded end 57 and this bore is adapted to receive an Allen screw 67 which serves to hold the threaded end 57 securely in place against loosening in operation. Also, just beneath the Allen screw there is provided a laterally extending ear 66 which forms a part of an optional feature of the present invention.

Projecting from the solid end 60 is a relatively thin flange 61 which with the solid end forms shoulders 62 on either side thereof. As shown in FIGURE 3, the flange 61 includes a central opening 64 and an offset opening 65 of limited size which extends part way through the flange in spaced relation to the central opening 64. The male end portion 41 similarly includes a solid end 68 which as mentioned closes the forward end of the inner member 13 and projecting from one end of the solid portion 68 are bifurcated flanges 70 which form a recess 71 of a size to permit reception of the male projection 61 for hinged connection therebetween. The bifurcated end portions include central openings 72 which are essentially the same size as the central opening 64 in the male flange 61 and are all of a size to receive in aligned relation a transverse bolt 74. It will additionally be noted that one bifurcated end includes a counterbore 75 and the other bifurcated end includes an offset opening 76 which is of limited size and is spaced from the central opening of that bifurcated end for alignment with the opening 65 in the male end.

The entire hinged connection 15 is constructed and arranged to establish free swinging movement of the frame 14 between the folded position and the extended position, and in the extended position to cause automatic, rigid interconnection between the male and female end portions so as to effectively prevent any tendency of the frame to return to folded position and to maintain it in straight, outwardly extending relation to the handle essentially as though the entire construction was one rigid member. To this end, the bolt 74 is formed with a shank 78 and head 79, the shank being threaded at its end for reception of a specially formed nut 80 which has an inwardly projecting pin 81 which is aligned for extension through the offset openings 65 and 76. In turn, spring 82 is positioned at one end of the shank against the head 79 and the counter bore 75 forms a seating surface to hold the spring 82 in compressed position against the head 79 so as to constantly urge the nut 80 and connected pin 81 inwardly.

As the optional feature associated with the ear 66, the outer end of the spring 82 includes an extension 82' which is of a length to extend away from the bolt for connection around the ear 66. By anchoring the inner free end of the spring to the surface of the bore 75 the spring may be wound also under helical tension so that the extension 82' will constantly bias the ear and connected male end 60 and frame 14 toward the outward, extended position. Alternately, the extension 82' may merely be connected in biased relation to some part of the frame to properly urge it to the extended position.

To understand the operation of the hinged assembly and the inter-relationship between the parts, when the frame 14 is disposed in folded relation with the outer end of the frame positioned against the free end 48 of the frame holder the offset openings 65 and 76 are out of alignment and the pin 81 has its end engaging, under the bias of the spring 82, the side of the male end portion 61. As the frame is freed from the frame holder to swing about the hinge assembly 15 toward the extended position, simultaneously the male end portion will swing about the bolt 74 and in this course of movement the offset opening 65 will rotate toward a position of alignment with the pin 81 and opening 76. Just as soon as the frame reaches the extended position the openings will be brought into alignment so that the pin 81 under the bias of the spring 82 will immediately move into the opening 65 to rigidly hold the frame in extended position. When it is desired to again fold the net into the retracted position, the bolt may merely be pressed against the bias of the spring 82 so as to release the pin 81 from the opening 65 and permit the male end to be swivelled or rotated relative to the female bifurcated end portions at which time the offset openings will move out of alignment as described above. Once returned to folded position, then by manually forcing the inner telescoping member 13 rearwardly against the bias of the spring 20 the net frame 14 will move into connected relation with the frame holder 45.

The optional feature of the present invention defined by the spring extension 82' and ear 66 provides for a way of applying a constant bias on the frame 14 to constantly urge it to swing into the forward extended position. Thus, once the end of the frame 14 clears the frame fastener 48 the extension 82' engaging the ear will cause the male end portion and connected frame to swing forwardly about the female end portion into the extended position whereupon the pin will immediately move into the opening 65. Of course, in the absence of the extension 82' and ear 66, merely by flipping or manually swinging the net frame outwardly, once cleared from the frame fastener the male end will tend to swing forwardly in the same way about the female end and the frame may be moved into the rigid, extended position.

From the above, it will be seen that the spring members 20 and 82 co-act in a unique manner to provide for simultaneous extension of the inner telescoping member 13 and the net or frame portion 14. For example, and assuming that some suitable means (not shown) is provided at the rearward closed end 22 of the outer member for connection to the belt of the user, the landing net when not in use will be in the retracted position with the pin 43 disposed in the opening 33 of the rearward catch 26 and the frame and mesh folded into inoperative position with the outer edge of the frame retained in position by the frame holder 45. By applying a rearward force to the lever 32 sufficient to flex the loop 31 outwardly for release of the pin, the pin and inner telescoping member 13 will be immediately urged forwardly through the outer member under the force of the spring 20 and the frame will follow the movement of the inner telescoping member so as to immediately clear the holder 45. Assuming that the spring extension 82' and 66 are provided as features thereof the frame will simultaneously swing outwardly into rigid extended position, as described, as the inner telescoping member 13 is sliding forwardly through the outer member 12; then, as the frame moves into rigid extended position the inner member 13 will similarly move into rigid connected position with the pin passing through the opening 37 of the catch 27. Thus, it will be apparent that at either end limit of movement the handle and frame will be positively held in rigid relation. Furthermore in the extended position the weighted mesh 16 will insure that the net is always in proper suspended position for retrieving fish. In retracting the net into inoperative position the bolt 74 first may be maunally pressed and the frame swung into folded position along the inner telescoping member 13, following which the free end portion 36 of the catch 27 may be forced forwardly and somewhat outwardly to release the pin 43. Thereupon the inner telescoping member 13 and folded frame 14 are forced rearwardly against the bias of the spring 20 until the pin moves into the opening 33 with the frame 14 engaging the frame holder 45 in which relation all parts are rigidly secured against accidental release or displacement until later desired for reuse.

As stated, as an alternative it is not necessary to employ the ear 66 in spring 82' in that once the frame 14 clears the holder 45 the frame may be merely flipped or manually swung outwardly into the extended position whereupon the pin 81 will immediately move into the opening 65 to rigidly hold the parts in desired relation. In forming the entire net assembly, various materials may of course be employed and form no part of the present invention although aluminum is desirably used due to its lightweight characteristics and strength. Moreover, the relative dimensions and sizes of the parts can be readily seen from the above description and drawings, especially the fact that the length of the frame 14 is essentially the same as the length from the end 48 to the hinge assembly 15 when the inner member 13 is in retracted position. It will be also evident that the hinge assembly of the present invention is adaptable for use with various types of fish net constructions, whether employed in association with extensible handle members or not, although this assembly has been found to be particularly effective in the manner in which it co-acts with the spring biased telescoping members for simultaneous extension of the handle and frame into operative position.

Accordingly, it will be understood that various changes and modifications may be made in the present invention without departing from the scope thereof as defined by the appended claims.

We claim:

1. An extensible fish net comprising: a net frame, a handle defined by inner and outer telescoping members, one telescoping member being slidable lengthwise in relation to the other between two end limits of movement on the other member defining retracted and extended positions, releasable means disposed on the other member at the end limits of movement for selectively and releasably holding said one member in either the retracted or extended position, said one member being biased for movement toward the extended position, a hinge assembly interconnecting said net frame and handle in pivotal relation for movement of said frame from a folded position lying along the handle to an extended position defining a forward continuation of said handle, means on the handle to hold said frame in the folded position and being selectively releasable for movement of said frame to the extended position, and means associated with said hinge assembly to hold said frame in rigid connected relation with the handle when in the extended position.

2. An extensible fish net comprising: a net frame, a handle defined by inner and outer telescoping members, one telescoping member being slidable in relation to the other member between two end limits of movement on the other member defining retracted and extended positions, and said one member being biased for movement toward the extended position, release means at the end limits of movement on the other member to rigidly connect the one member in each position and being selectively releasable to enable movement of said one member to the other position, a hinge assembly interconnecting said frame and handle for pivotal movement of said frame between a folded position along the handle and an extended position, said assembly including means biasing said frame to the extended position, a frame holder on said handle to retain said frame in the folded position when said handle is in the retracted position, said frame moving free of the holder upon selective release of said one telescoping member from the retracted position so that said one member and said frame are simultaneously urged under bias to their respective extended positions.

3. An extensible fish net comprising: a net frame, a handle defined by inner and outer telescoping members, the inner member having a pin slidable forwardly and rearwardly in a longitudinal slot in said outer member between two end limits of movement defining retracted and extended positions, limit stop members at the end limits of movement for engaging said pin and each being movable for selective release of said pin, said inner member being biased for movement toward the extended position, a hinge assembly interconnecting said frame and handle for pivotal movement of said frame between a folded position along the handle and an extended position, a frame holder to retain said frame in the folded position when said inner member is in a retracted position, said frame being movable away from said holder upon selective release of the pin for said inner member for movement toward the extended position so that said frame is free to pivot to its extended position.

4. An extensible fish net comprising: a net frame, having a weighted mesh, a handle defined by inner and outer telescoping members, the inner member having a pin slidable forwardly and rearwardly in a longitudinal slot in said outer member between two end limits of movement defining a retracted and extended position, limit stop members disposed at the end limits of movement for receiving said pin and each being manually releasable for selective release of said pin, said inner member being biased for movement toward the extended position, and a hinge assembly interconnecting said frame and handle for pivotal movement between a folded and extended position, said assembly including a male and female end portions together with a bolt having an offset pin thereon, said bolt being dimensioned for extension through central aligned openings in said end portions and said offset pin being dimensioned for reception in offset openings in said ends, the offset openings being movable into alignment for reception of said offset pin when said frame is pivoted into the extended position, said bolt being biased to urge said offset pin inwardly through the offset openings to maintain said frame in rigid connected relation with the handle when in the extended position, and a frame holder on the outer member of said handle to retain said frame in the folded position when said inner member is in the retracted position.

5. In a fish landing net having a handle and frame, a hinged connection assembly interconnecting the handle and frame for movement of the frame between a folded and extended position, said assembly comprising a female end portion, a male projecting end portion and a bolt being adapted to extend through central aligned openings in said male and female end portions, a nut secured at one end of the bolt including an inwardly extending pin disposed for extension into offset openings in said end portions, said offset openings being disposed in relation to one another for movement into alignment when said frame is rotated into an extended position, and means on said bolt for biasing the pin for projection through the offset openings when in aligned relation.

6. In a fish landing net having a handle and frame, a hinged connection assembly between the handle and frame for movement of the frame between a folded and extended position, said assembly comprising a bifurcated female end portion connected to the handle, a male projecting end portion connected to the frame for insertion in said female end portion, and a bolt extending through central aligned openings in said male and female end portions, a nut secured at one end of the bolt including an inwardly extending pin adapted for extension into offset openings in said end portions, said openings being disposed in relation to one another for movement into alignment when said frame is rotated into the extended position, means on said bolt for biasing the pin for movement through the offset openings when in aligned relation and said biasing means including an extension engaging a portion of said frame so as to urge said frame to the extended position at all times, and means on said handle to hold said frame in folded position and being selectively releasable for movement of the frame to the extended position.

7. In a fish landing net having a handle and frame, a hinged connection assembly between the handle and frame for movement of the frame between a folded and extended position, said assembly comprising a bifurcated female end portion connected to the handle, a male projecting end portion connected to the frame for insertion in said female end, and a bolt extending through central aligned openings in said male and female end portions, a nut secured at one end of the bolt including an inwardly extending pin adapted for extension into offset openings in said end portions, said offset openings disposed in relation to one another for movement into alignment when said frame is rotated into the extended position, a spring on said bolt for biasing the pin for projection through the offset openings when in aligned relation and said spring including an extension at one end connected to said frame and being biased to urge said frame to an extended position at all times, and a holder on said handle to hold said frame in the folded position and said frame being releasable from the holder for movement to the extended position.

References Cited in the file of this patent

UNITED STATES PATENTS

| | | |
|---|---|---|
| 215,099 | Conover | May 6, 1879 |
| 2,245,993 | McCoy | June 17, 1941 |
| 2,653,404 | Phaneuf | Sept. 29, 1953 |
| 2,657,491 | Ziebell | Nov. 3, 1953 |